United States Patent
Ingriselli et al.

(10) Patent No.: US 7,338,731 B2
(45) Date of Patent: Mar. 4, 2008

(54) COMPACT REACTANT GAS PLUMBING SERVING DUAL IDENTICAL FUEL CELL STACKS

(75) Inventors: Enzo Ingriselli, Southington, CT (US); Dale W. Petty, Wallingford, CT (US)

(73) Assignee: UTC Power Corporation, South Windsor, CT (US)

( * ) Notice: Subject to any disclaimer, the term of this patent is extended or adjusted under 35 U.S.C. 154(b) by 596 days.

(21) Appl. No.: 10/713,799

(22) Filed: Nov. 13, 2003

(65) Prior Publication Data

US 2005/0106437 A1   May 19, 2005

(51) Int. Cl.
*H01M 8/04* (2006.01)
*H01M 2/00* (2006.01)

(52) U.S. Cl. .............. 429/38; 429/32; 429/34; 429/35; 429/39

(58) Field of Classification Search .................. 429/12
See application file for complete search history.

(56) References Cited

U.S. PATENT DOCUMENTS 6,613,470 B1 *   9/2003   Sugita et al. ................. 429/38
2001/0002299 A1 *   5/2001   Reiser ........................ 429/13
2002/0187382 A1 * 12/2002   Nishiumi et al. ............. 429/34
2005/0106446 A1 *   5/2005   Sato et al. .................... 429/38

* cited by examiner

*Primary Examiner*—Jonathan Crepeau
*Assistant Examiner*—Tony Chuo
(74) *Attorney, Agent, or Firm*—M. P. Williams

(57) ABSTRACT

A power plant (10) having a pair of substantially identical fuel cell stacks (12, 13), each having an oxidant or fuel inlet/outlet manifold (15, 16) identical to the inlet/outlet manifold of the other stack, each inlet/outlet manifold mounted on the same side of the corresponding stack as the other inlet/outlet manifold on the other stack (the right side herein). Inlet/outlet plumbing is disposed at the end of one of the stacks (12) between the inlet/outlet manifolds (15, 16), the plumbing including a T-like transition (43) between a supply pipe (46) and an inlet tube (39) that feeds the inlets of both of the inlet/outlet manifolds (15, 16). At each inlet/outlet manifold, the side which is not connected to plumbing is blocked off with a seal plate (25, 32). Inlet and outlet tubes (38, 39) include flexible tubing portions, whereby to allow for dimensional and/or positional variations between fuel cell power plants.

3 Claims, 2 Drawing Sheets

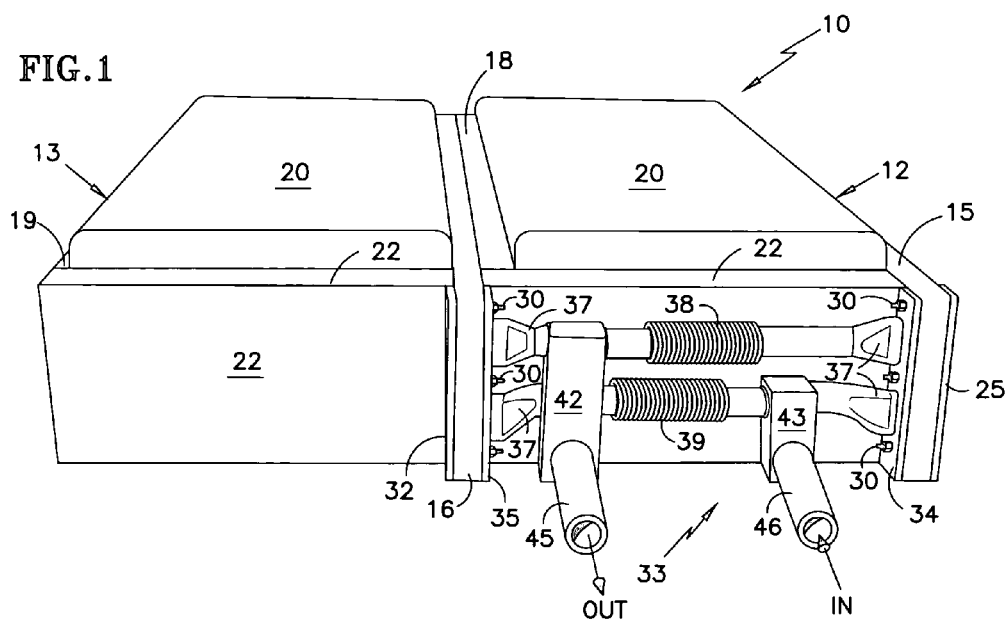
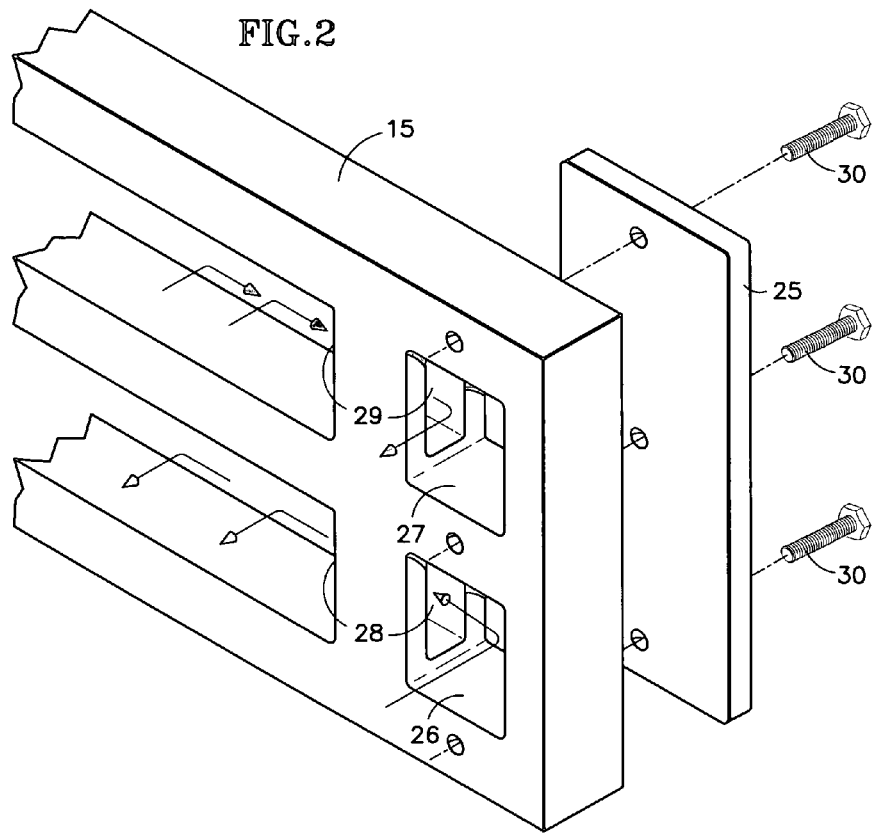

000
COMPACT REACTANT GAS PLUMBING SERVING DUAL IDENTICAL FUEL CELL STACKS

TECHNICAL FIELD

This invention relates to providing reactant gas inlet and exhaust plumbing to two identical fuel cells in a compact manner, with flexibility to allow for tolerance variation, with uniform flow distribution to each fuel cell stack.

BACKGROUND ART

The utilization of fuel cell power plants to operate electric vehicles, particularly private passenger vehicles, requires that the fuel cell power plant be able to fit within space that is available in the vehicle. To help maximize the fuel cell stack volume that can be accommodated in smaller vehicles, the use of two fuel cells mounted side by side is one plausible solution. However, if there are two separate fuel cell stacks in a power plant, then the amount of external plumbing required to supply the fuel and oxidant reactant gases and carry off the exhaust thereof must be doubled, one set for each fuel cell.

DISCLOSURE OF INVENTION

Objects of the invention include: providing supply and exhaust plumbing which need not be duplicated for two fuel cells disposed together in a single fuel cell power plant; compact fuel reactant gas plumbing for fuel cell power plants; fuel cell reactant gas plumbing which is easily disposed on dual fuel cell stack power plants despite tolerance variations; improved fuel cell reactant gas plumbing; and simple, compact fuel cell reactant gas plumbing.

According to the invention, two identical fuel cells are mounted adjacent to each other in the same orientation, thereby providing a reactant gas inlet on the same-handed side (e.g., the right side in the disclosed embodiment) of both fuel cell stacks; each reactant gas inlet manifold has the ability to both receive and exhaust reactant gas on either the right side of the manifold or the left side of the manifold, as seen in the disclosed embodiment, whereby a single configuration of reactant gas inlet and outlet plumbing can feed and exhaust one reactant gas of one stack from its left side and feed and exhaust the reactant gas of the other stack from its right side, being disposed between the stacks.

According further to the invention, a single set of reactant gas inlet and outlet plumbing includes, between inlets and outlets of two separate reactant gas inlet/outlet manifolds, flexible tubing which accommodates variations in exact positioning and/or dimensions of the inlet/outlet manifolds from one fuel cell power plant to the next.

According to the invention, an inlet transition piece, between the fuel reactant gas supply pipe and the fuel reactant gas inlet tubing, connects the fuel reactant gas inlet tubing to a fuel reactant gas supply pipe which is normal to the tubing, thereby improving the distribution of fuel reactant gas within the tubing as it approaches the respective inlet/outlet manifolds.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a perspective view of a pair of fuel cell stacks having reactant gas plumbing in accordance with the present invention.

FIG. 2 is a partial perspective view of an end of a fuel inlet/outlet manifold.

MODE(S) FOR CARRYING OUT THE INVENTION

Figure 3:
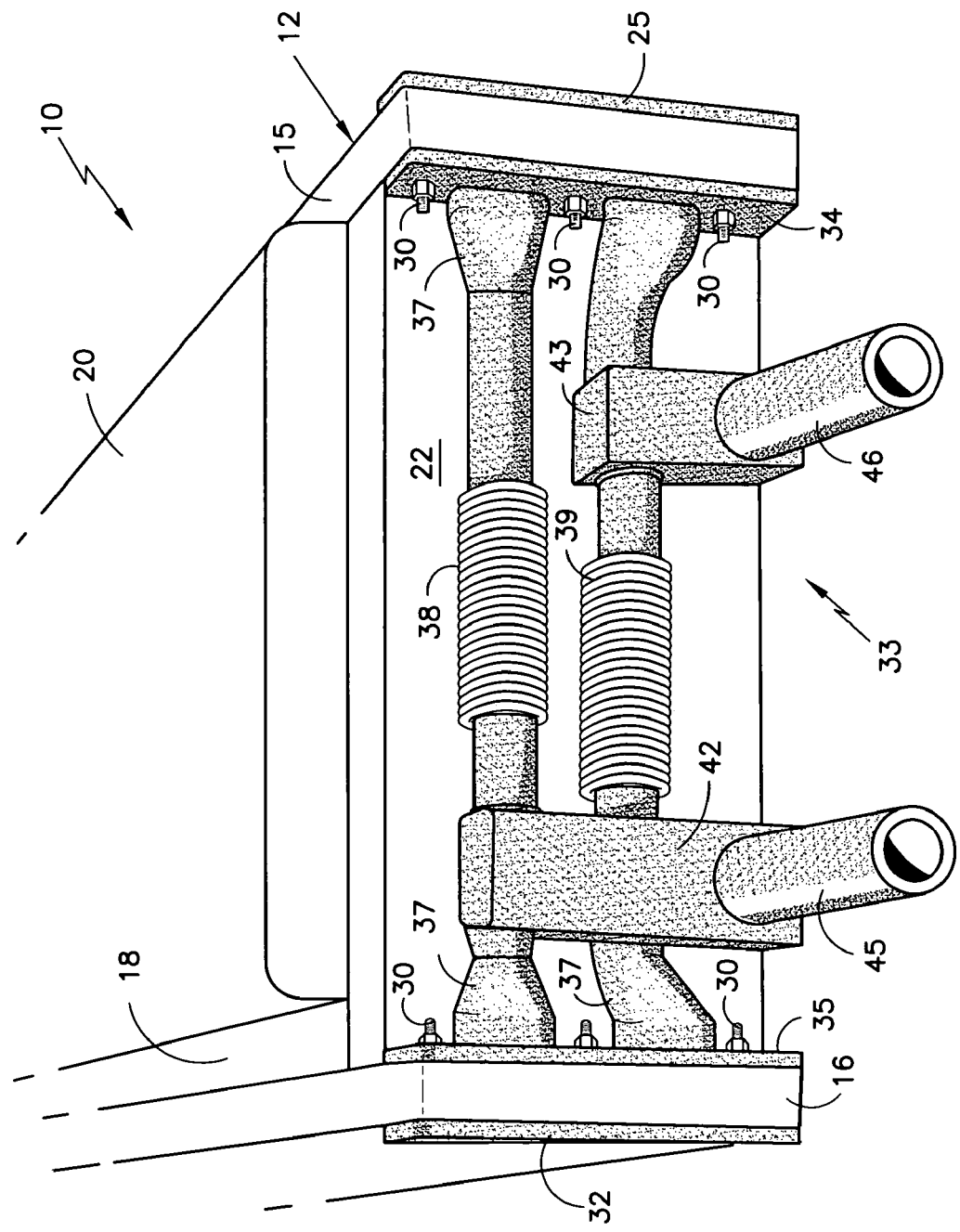
FIG. 3 is a detailed perspective view of the plumbing of FIG. 1.

Referring now to FIG. 1, the invention is embodied in a fuel cell power plant having two fuel cell stacks 12, 13 which are, for all purposes relevant to the invention, essentially identical. The two fuel cell stacks 12, 13 are laid out edge to edge, each in the same orientation (or handedness) as the other. A fuel inlet/outlet manifold 15 is on the right side of the fuel cell stack 12 as seen in FIG. 1, and the fuel inlet/outlet manifold 16 is on the right side of the fuel cell stack 13 as seen in FIG. 1. Similarly, the fuel turn manifold 18 is on the left side of the fuel cell stack 12, and the fuel turn manifold 19 is on the left side of the fuel cell stack 13, as seen in FIG. 1. A respective air turn manifold 20 may be on the top of each fuel cell stack 12, 13. Each fuel cell stack has a pressure plate 22 at either end thereof, only the pressure plates 22 being visible in the foreground.

Referring to FIG. 2, the fuel inlet/outlet manifold 15 is shown; the fuel inlet/outlet manifold 16 is identical thereto. The fuel inlet/outlet manifold 15 has a seal plate 25 disposed on the right hand side thereof as seen in FIGS. 1 and 2 so as to seal off the fuel inlet 26 and the fuel outlet 27 from ambient. For clarity of illustration, the fuel inlet 26 is shown communicating with each of the fuel cell's fuel reactant gas flow fields through a chamber 28, and the fuel outlet 27 is shown communicating with each of the fuel cells through a chamber 29. Because the electricity producing process in each fuel cell stack 12, 13 is totally independent of the like process in the other fuel cell stack, it is irrelevant that the intersection piece 43 is closer to the stack 12 than it is to the stack 13, since inlet fuel need not reach both stacks simultaneously as is the case for the individual cells in either one of the stacks. The details of the manner of communication with the fuel flow fields of each fuel cell are conventional, and form no part of the invention.

In FIG. 1, the fuel inlet/outlet manifold 16 also has a seal plate 32, but that is disposed on the left side of the inlet/outlet manifold 16. This arrangement allows the fuel inlet/outlet plumbing 33 to be disposed adjacent to one of the fuel cell stacks, in this case stack 12, yet serve both fuel cells at the same time. This is an important aspect of the present invention. Each seal plate 25, 32 in this embodiment is attached, by bolts 30 or other known means through the corresponding fuel inlet/outlet manifold 15, 16, to a corresponding flange 34, 35 on the opposite side of the related inlet/outlet manifold 15, 16 from the seal plate 25, 32. Although not shown, for clarity, o-ring or similar, conventional seals are required around the fuel inlets and outlets 26, 27 of both manifolds 15, 16.

The flanges are interconnected with each other through transition pieces 37 and metal tubing, including flexible metal tubing 38, 39 and corresponding intersection pieces 42, 43, the intersection piece 42 feeding a fuel exhaust 45 and the intersection piece 43 being fed by a fuel supply pipe 46 as shown in FIGS. 1 and 3. The intersection piece 42 is tall and the lower portion of it is thin enough to allow the tube 39 to pass behind it. The intersection piece 43 is short so that the tube 38 may pass over it. The flexible tubing 38, 39 accommodates variations in dimensions and/or positioning between the inlet/outlet manifolds of different fuel cell power plants of the same design.

The inlet/outlet positions 45, 46 may be reversed depending on designs of specific power plants. A similar inlet/outlet plumbing arrangement may be used to distribute the oxidant to the fuel cell.

The inlet/outlet plumbing 33 may be fabricated from metals, plastics or reinforced plastics, rubbers and filled rubbers, that are selected to have a low permeability to the reactant fluid.

Although shown simplistically as the chamber 28, the fuel inlet to the fuel reactant gas flow fields of the fuel cells may in fact comprise a cascade fuel inlet manifold as disclosed in U.S. patent application Ser. No. 10/269,654, filed Oct. 10, 2002. Alternatively, some other form of inlet fuel distributor may be utilized to assure uniform distribution of fuel to all of the fuel cells. All of this is irrelevant to the present invention.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant, comprising:
   a pair of fuel cell stacks, each of said fuel cell stacks having a reactant gas inlet/outlet manifold, said fuel cell stacks being disposed side by side so that the reactant gas inlet/outlet manifold of one of said stacks is adjacent a reactant gas turn manifold of the other one of said stacks; each of said reactant gas inlet/outlet manifolds having a reactant gas inlet and a reactant gas outlet which are accessible from a first face of said inlet/outlet manifold or from a second face of said inlet/outlet manifold which is opposite to said first face;
   a fuel plumbing arrangement interconnected between a reactant gas supply pipe and said inlet/outlet manifold inlets, said plumbing interconnecting with one of said inlets on a first face of a first one of said inlet/outlet manifolds and interconnecting with another of said inlets on a second face of a second one of said inlet/outlet manifolds, and exhaust plumbing extending, from an outlet on said first face of said first inlet/outlet manifold and from an outlet on said second face of said second inlet/outlet manifold, to an exhaust pipe; and
   a pair of seal plates, one disposed on said second face of said first inlet/outlet manifold and one disposed on said first face of said second inlet/outlet manifold, whereby to close off said inlet/outlet manifolds.

2. A power plant according to claim 1 wherein said reactant gas inlet/outlet manifolds are fuel inlet/outlet manifolds.

3. A power plant according to claim 1 wherein said plumbing includes flexible tubing extending between the inlet of one of said inlet/outlet manifolds and the inlet of the other of said inlet/outlet manifolds, and comprises flexible tubing extending from the outlet of one of said inlet/outlet manifolds to the outlet of another of said inlet/outlet manifolds, whereby to accommodate dimensional variations in fuel cell stacks.

* * * * *